US009592610B2

(12) United States Patent
Matsunaga et al.

(10) Patent No.: US 9,592,610 B2
(45) Date of Patent: Mar. 14, 2017

(54) REMOTE CONTROLLER

(75) Inventors: Shinichi Matsunaga, Wako (JP); Naohide Ogawa, Wako (JP); Kimio Takahashi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 2145 days.

(21) Appl. No.: 12/521,828

(22) PCT Filed: Oct. 7, 2008

(86) PCT No.: PCT/JP2008/002827
§ 371 (c)(1),
(2), (4) Date: Jun. 30, 2009

(87) PCT Pub. No.: WO2009/075048
PCT Pub. Date: Jun. 18, 2009

(65) Prior Publication Data
US 2010/0036527 A1     Feb. 11, 2010

(30) Foreign Application Priority Data
Dec. 10, 2007   (JP) .................................. 2007-318497

(51) Int. Cl.
*B25J 13/06*   (2006.01)
*B25J 9/16*    (2006.01)
(Continued)

(52) U.S. Cl.
CPC .............. *B25J 13/06* (2013.01); *B25J 9/1676* (2013.01); *G05D 1/0033* (2013.01); *G05D 1/024* (2013.01);
(Continued)

(58) Field of Classification Search
CPC ....... B25J 13/06; B25J 9/1676; G05D 1/0033; G05D 1/024; G05D 1/0251; G05D 1/027;
(Continued)

(56) References Cited

U.S. PATENT DOCUMENTS 4,986,384 A * 1/1991 Okamoto et al. ............. 180/167
5,461,292 A * 10/1995 Zondlo ......................... 318/587
(Continued)

FOREIGN PATENT DOCUMENTS

EP   1621948    2/2006
JP   61-095414  5/1986
(Continued)

OTHER PUBLICATIONS

T30-011-200.pdf (C. Tavolieri, E. Ottaviano, M. Ceccarelli and A. Nardelli, A Design of a New Leg-Wheel Walking Robot, Jul. 27-29, 2007, Proceedings of the 15th Mediterranean Conference on Control& Automation, pp. 1-6).*

*Primary Examiner* — Bao Long T Nguyen
(74) *Attorney, Agent, or Firm* — Rankin, Hill & Clark LLP

(57) ABSTRACT

A remote controller enables a user to manipulate behavior of a robot so that the robot does not stray away from a given area and also avoids contact with an object. If a route designated by the user satisfies a stable movement requirement, a first command signal is transmitted from the remote controller to the robot. By doing so, it is possible to move the robot according to the designated route. On the other hand, if the route designated by the user does not satisfy the stable movement requirement, the first command signal is not transmitted from the remote controller to the robot. Therefore, it is possible to stop the robot from moving according to the designated route, and further to avoid the situation where the robot strays away from the designated region, or comes into contact with the object.

13 Claims, 5 Drawing Sheets

(51) Int. Cl.
*G05D 1/00* (2006.01)
*G05D 1/02* (2006.01)

(52) U.S. Cl.
CPC ........... *G05D 1/027* (2013.01); *G05D 1/0251* (2013.01); *G05D 1/0272* (2013.01); *G05D 1/0278* (2013.01); *G05D 2201/0217* (2013.01)

(58) Field of Classification Search
CPC ............... G05D 1/0272; G05D 1/0278; G05D 2201/0217
See application file for complete search history.

(56) References Cited

U.S. PATENT DOCUMENTS

| | | | |
|---|---|---|---|
| 6,463,374 B1 * | 10/2002 | Keller et al. | 701/50 |
| 6,574,536 B1 * | 6/2003 | Kawagoe et al. | 701/23 |
| 6,633,800 B1 * | 10/2003 | Ward et al. | 701/2 |
| 7,539,557 B2 * | 5/2009 | Yamauchi | 700/245 |
| 2004/0016077 A1 | 1/2004 | Song et al. | |
| 2005/0171636 A1 | 8/2005 | Tani | |
| 2008/0027590 A1 * | 1/2008 | Phillips et al. | 701/2 |

FOREIGN PATENT DOCUMENTS

| | | |
|---|---|---|
| JP | 09-212225 | 8/1997 |
| JP | 09-212229 | 8/1997 |
| JP | 2003-340764 | 12/2003 |
| JP | 2004-299025 | 10/2004 |
| JP | 2006-048472 | 2/2006 |
| JP | 2006-113858 | 4/2006 |
| JP | 2006-293976 | 10/2006 |
| JP | 2007-122304 | 5/2007 |
| JP | 2007-216381 | 8/2007 |
| JP | 2007-226322 | 9/2007 |
| JP | 2007-257195 | 10/2007 |

* cited by examiner

FIG.3
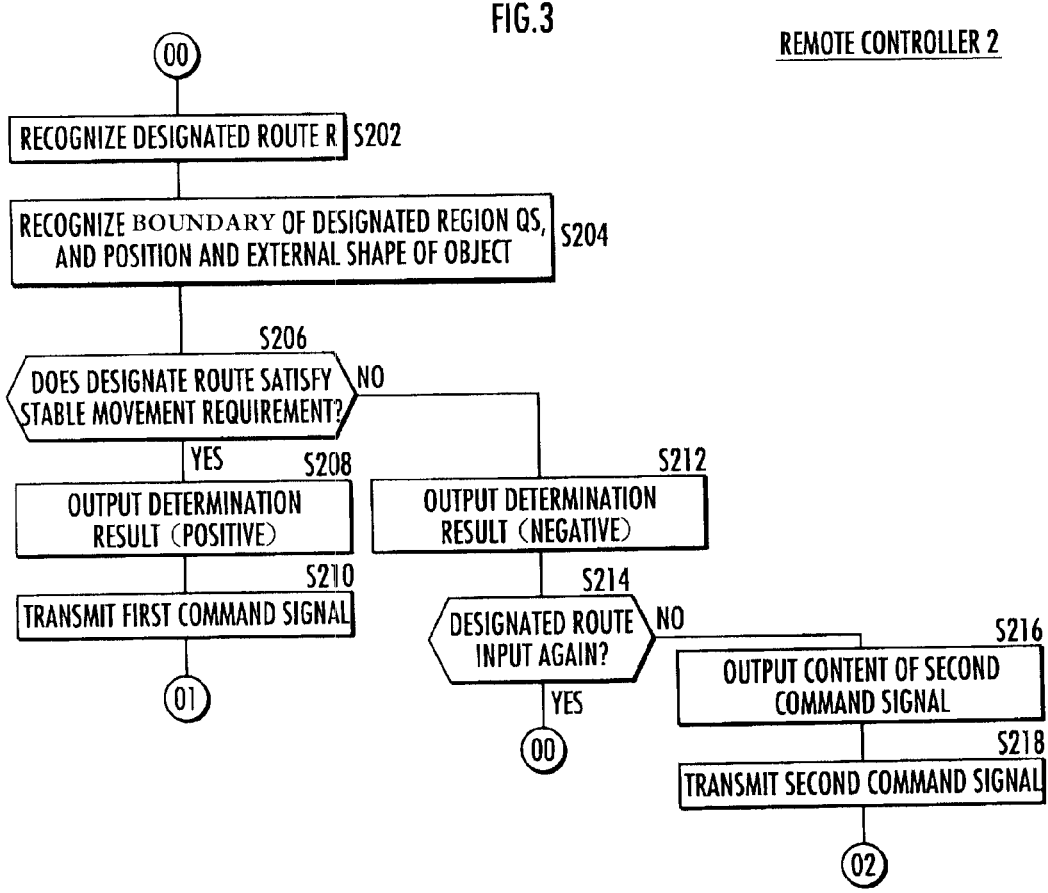
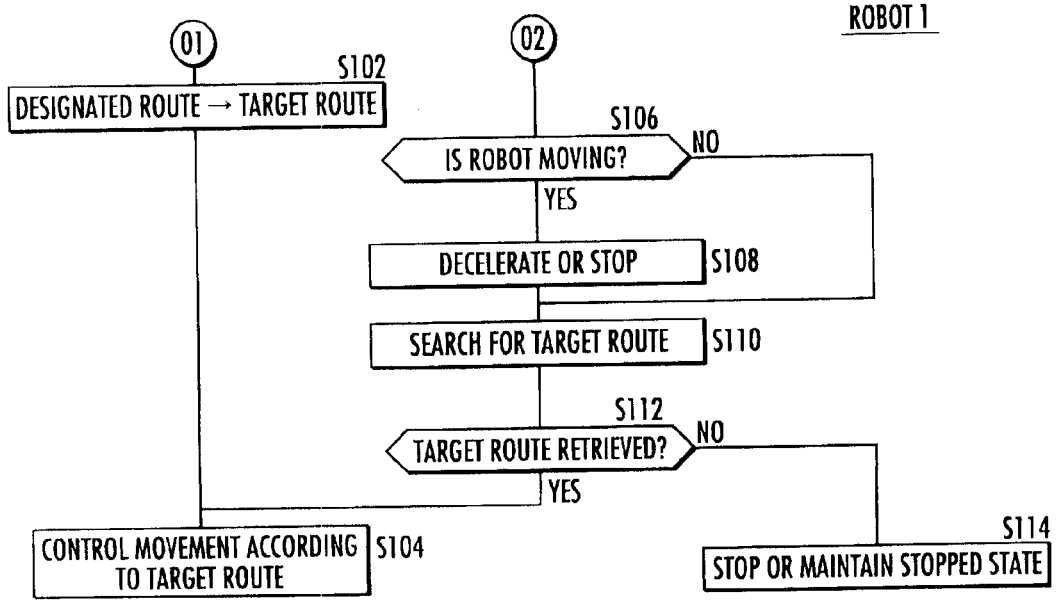

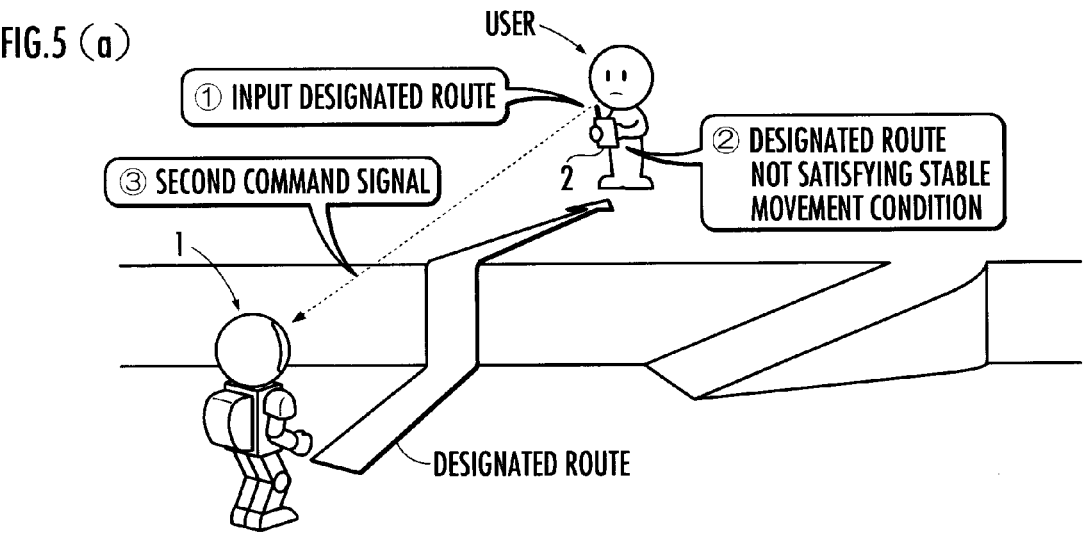
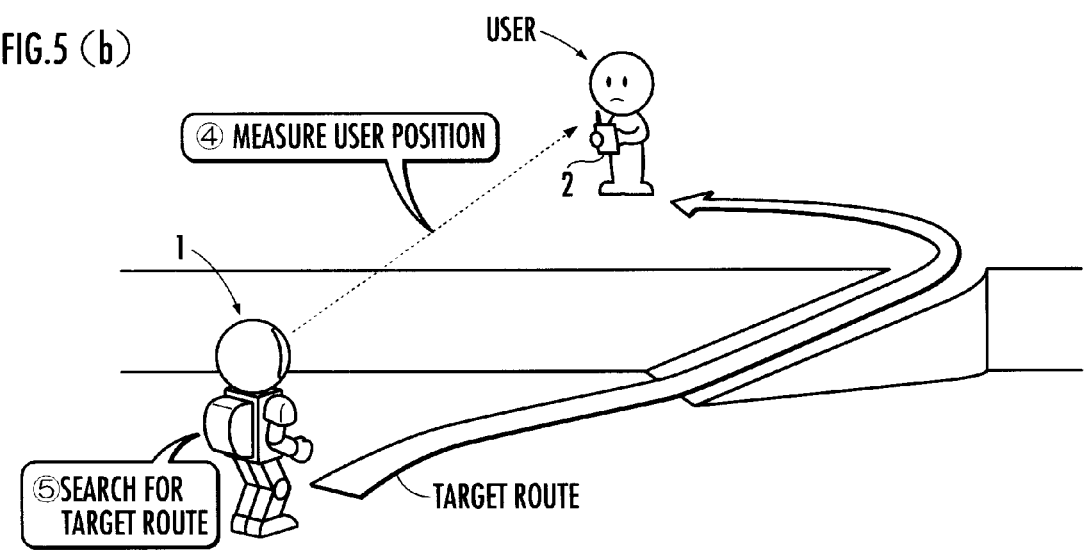
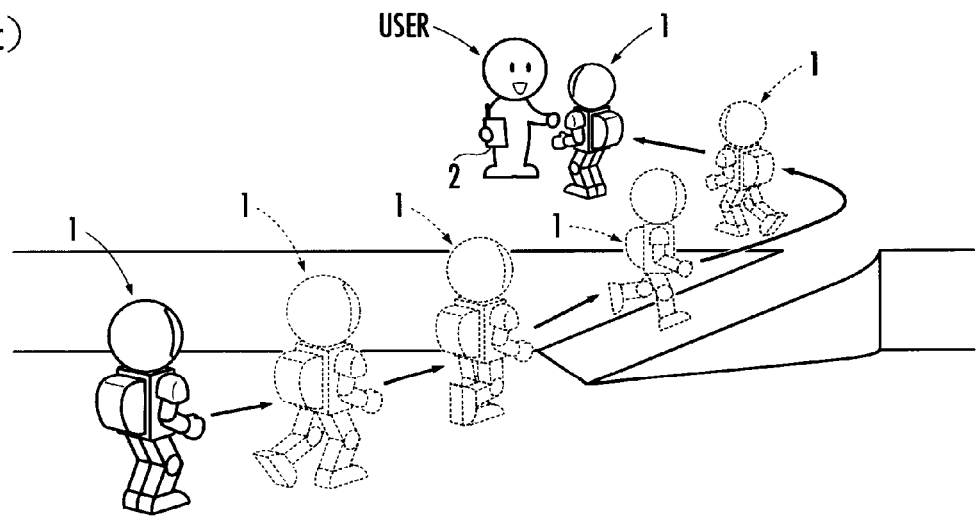

REMOTE CONTROLLER

BACKGROUND OF THE INVENTION

Technical Field

The present invention relates to a remote controller for remotely manipulating a robot which behaves autonomously.

Description of the Related Art

When making a robot guide a human being to a target destination in facilities such as an office or a museum, there is proposed a technique of making the robot recognize the walking condition of this human being, from the viewpoint of maintaining the distance between the robot and the human being to an appropriate distance and the like (refer to Japanese Patent Application Laid-Open No. 2003-340764). Further, when making the robot follow the human being, there is proposed a technique of making the robot output voice and the like in order to communicate with the human being (refer to Japanese Patent Application Laid-Open No. 2004-299025).

However, if the robot strays away from a given area, or come into contact with an object, when the robot is moving, such will disturb the leading of a moving object such as a human being, or the following of the moving object.

SUMMARY OF THE INVENTION

In view of the above circumstances, an object to be solved by the present invention is to provide a remote controller enabling a user to manipulate a behavior of a robot, so that the robot does not stray away from a given area, and also avoid contact with an object.

According to a first aspect of the present invention, there is provided a remote controller for making a user remotely manipulate a robot moving autonomously, comprising: a first manipulation processing element which recognizes a designated route input by the user via an input device, and which further recognizes a boundary of a designated region and a position and an external shape of an object existing in the designated region; and determines whether or not the designated route satisfies a stable movement requirement, which is a requirement in which the robot is capable of moving without straying away from the designated region as well as in a condition having low possibility of coming into contact with the object, on the basis of the recognition result of the first manipulation processing element, and which transmits a first command signal to the robot for making the robot to move according to the designated route, on condition that the determination result is positive.

According to the remote controller of the first aspect of the invention, if the designated route designated by the user satisfies the stable movement requirement, the first command signal is transmitted from the remote controller to the robot. By doing so, it is possible to make the robot behave so as to move in accordance with the designated route. On the other hand, if the designated route designated by the user does not satisfy the stable movement requirement, the first command signal is not transmitted from the remote controller to the robot. As such, the situation where the robot is moved in accordance with the designated route, and consequently the robot strays away from the given area or comes into contact with the object is avoided. Therefore, it is possible for the user to use the remote controller in order to manipulate the behavior of the robot so that the robot does not stray away from a given area, and also avoid contact with the object.

Further, in the remote controller according to the first aspect of the invention, as the remote controller of a second aspect of the invention, the second manipulation processing element transmits a second command signal to the robot on condition that the determination result is negative, the second command signal makes the robot search for a route which has common terminal point or common starting and terminal points with the designated route and which satisfies the stable movement requirement as a target route, and makes the robot move according to the target route when the target route is retrieved, and on the other hand makes the robot stop or maintain the moving state thereof when the target route is not retrieved.

According to the remote controller of the second aspect of the invention, if the designated route designated by the user does not satisfy the stable movement requirement, the second command signal is transmitted from the remote controller to the robot. By doing so, it is possible to make the robot search for a route satisfying the stable movement requirement as the target route, and make the robot move in accordance with the target route if the target route is retrieved. On the other hand, if the target route is not retrieved, it is possible to stop the robot or maintain its stopped state. Therefore, it is possible to manipulate the behavior of the robot so as to make the robot move towards the terminal point of the designated route without straying away from the designated region and while avoiding contact with the object, even when the designated route not satisfying the stable movement requirement is input by the user with the remote controller.

Further, in the remote controller according to the second aspect of the invention, as the remote controller of a third aspect of the invention, the second manipulation controlling element transmits the second command signal to the robot, the second command signal makes the robot decelerate or stop and thereafter search for the target route, when the robot is moving.

According to the remote controller of the third aspect of the invention, it is possible to decelerate or stop the robot before searching for the target route when the robot is moving. Therefore, it is possible for the user to use the remote controller in order to manipulate the behavior of the robot so that the robot does not stray away from the designated region, and also avoid contact with an object, when the robot is searching for the target route.

Further, in the remote controller according to the first aspect of the invention, as the remote controller of a fourth aspect of the invention, the second manipulation processing element outputs the determination result in relation to the stable movement requirement, or a behavior mode of the robot defined by the second command signal via an output device.

According to the remote controller of the fourth aspect of the invention, it is possible to make the user recognize whether or not the designated route designated by the user satisfies the stable movement requirement, or the behavior mode of the robot which is different from the movement according to the designated route. Therefore, it is possible for the user to use the remote controller in order to manipulate the behavior of the robot so that the robot does not stray away from the designated region, and also avoid contact with the object, while predicting the behavior mode of the robot.

BRIEF DESCRIPTION OF THE DRAWINGS

FIG. 3 is an explanatory view related to the function of the remote controller;

FIG. 5 is an explanatory view related to the function of the remote controller.

DETAILED DESCRIPTION OF THE PREFERRED EMBODIMENTS

An embodiment of a remote controller according to the present invention will now be explained below with reference to the accompanying drawings.

Figure 1:
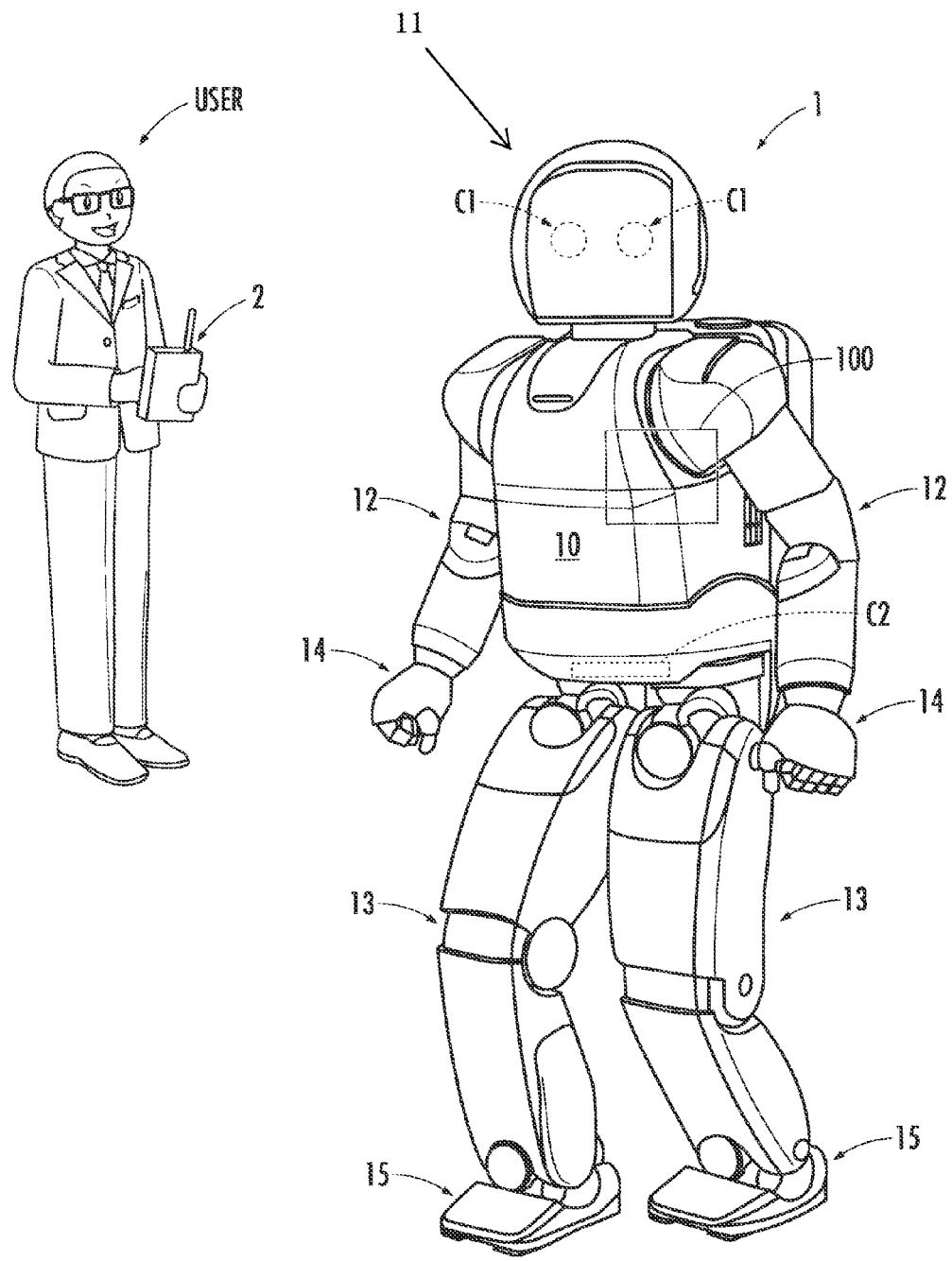
FIG. 1 is an explanatory view of the configuration of a robot as a manipulation object of a remote controller according to the present invention.

A robot 1 shown in FIG. 1 is a legged mobile robot as an operation object of a remote controller 2, and is equipped with, as is the same with a human being, a body 10, a head 11 provided to the upper part of the body 10, left and right arms 12 extended from upper left and right sides of the body 10, a hand 14 provided to the tip end of the arm 12, left and right legs 13 extended downwardly from the lower portion of the body 10, and a foot 15 attached to the tip end of the leg 13. As is disclosed in Published Japanese Translation of PCT Application 03-090978 or Published Japanese Translation of PCT Application 03-090979, the robot 1 is capable of bending and stretching the arm 12 and the leg 13 at a plurality of joints respectively corresponding to human being's plurality of joints such as a shoulder joint, an elbow joint, a carpal joint, a hip joint, a knee joint, a foot joint, by the force transmitted from an actuator 1000 (refer to FIG. 2). The robot 1 is capable of moving autonomously by a movement involving repetition of lifting and landing each of the left and right leg 13 (or foot 15). The height of the head 11 may be adjusted by adjusting the inclination angle of the body 10 with respect to the vertical direction thereof. The robot may be the robot 1 autonomously moving by the operation of a plurality of the leg 13, or may be any other robot having moving function, such as a wheel-type moving robot (automobile) or the like.

The robot 1 is equipped with a control device 100 configured by an ECU or a computer (configured by a CPU, a ROM, a RAM, an I/O and the like) as a hardware, and a communication equipment 102. A control program (software) is stored in a memory of the computer. The control program may be installed to the computer through software recording medium such as a CD or DVD, but may be downloaded to the computer from a server via a network or a satellite upon transmission of a request signal from the robot 1 to the server.

Figure 2:
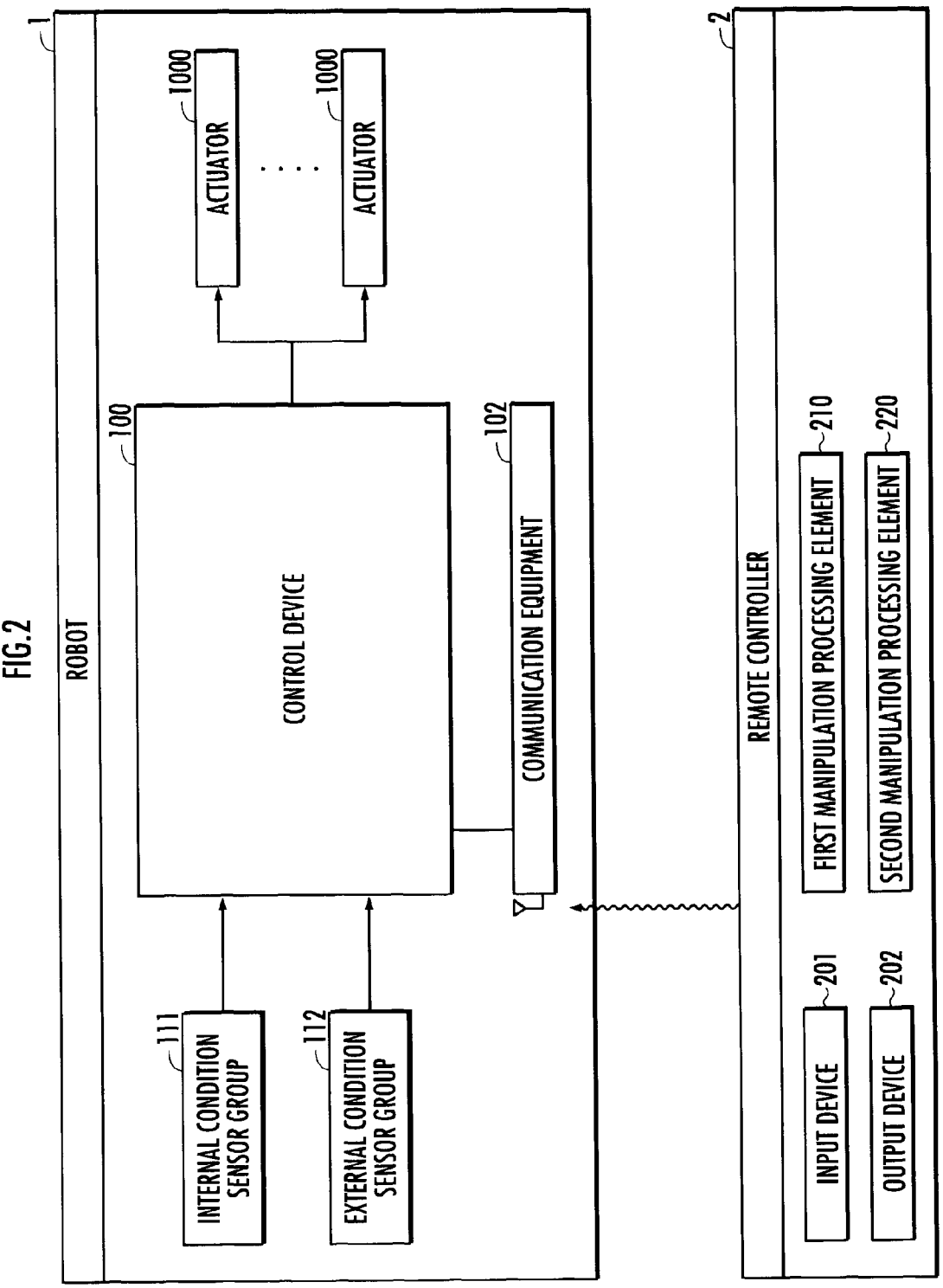
FIG. 2 is an explanatory view of the configuration of the remote controller according to the present invention.

The control device 100 shown in FIG. 2 controls the behavior of the robot 1 in accordance with a command signal which is transmitted from the remote controller 2 and received by the communication equipment 102. The control device 100 controls the operation of the arm 12 and the leg 13, by controlling the operation of the actuator 1000 on the basis of the output signals from an internal condition sensor group 111 and an external condition sensor group 112 or the like. The "internal condition" includes a position of a reference point such as a center of gravity of the robot 1 in a fixed coordinate system, an orientation of a moving direction of the robot 1, a posture determined by the angle of each joint or the like, and a force the robot 1 receives from outside via the hand 14, and the like. The "internal condition sensor group" includes a GPS receiver which receives signals indicating the latitude and the longitude defining the position of the robot 1 from the satellite, a yaw rate sensor outputting signals corresponding to the angular velocity of the robot 1 around z axis, an acceleration sensor outputting signals according to the acceleration of the robot 1 in the X direction or the like, a rotary encoder outputting signals according to the angle of each joint, and a six-axis force sensor outputting signals according to the force acting on the hand 14 from outside, and the like. The "external condition" of the robot 1 includes a position of a representative point of an object W in the fixed coordinate system or a robot coordinate system, a posture of the object W, and a passable region set by a wall of a route or the like. The "external condition sensor group" includes a pair of left and right head camera $C_1$ mounted on the head 11 with the imaging region set to the front of the robot 1, which is capable of perceiving light in various frequency band such as a CCD camera and a infrared camera, a waist camera $C_2$ provided at the bottom of the body 10 for measuring the position, orientation and the like of the object by detecting the near-infrared laser light emitted with the direction set at lower front of the robot 1 and reflected by the object, and the like (refer to FIG. 1).

The remote controller 2 is equipped with an input device 201, an output device 202, a first manipulation processing element 210, and a second manipulation processing element 220. The input device 201 is configured from an input device of a touch-panel type or a touch-with-pen type, or a voice recognition device and the like, and is capable of making the user input a designated route through manipulation or utterance and the like. The output device 202 is configured from a display device or an audio equipment, and is capable of making the user recognize information on a shape or the like of the designated route visually or auditorily. The first manipulation processing element 210 recognizes the designated route input by the user through the input device 201, and further recognizes the boundary of a designated region QS, and the position and the external shape of the object existing in the designated region (refer to FIG. 4(a)). The second manipulation processing element 220 determines whether or not the designated route satisfies a stable movement requirement, on the basis of the recognition result of the first manipulation processing element 210. The "stable movement requirement" is a requirement in which the robot 1 is capable of moving without straying away from the designated region QS as well as in a condition having low possibility of coming into contact with the object. The second manipulation processing element 220 transmits a first command signal to the robot 1 on condition that the determination result is positive, that is, it is determined that the designated route satisfies the stable movement requirement. The second manipulation processing element 220 transmits a second command signal to the robot 1 on condition that the determination result is negative, that is, it is determined that the designated route does not satisfy the stable movement requirement.

The "recognition" of information by a constituent element in the present invention means to carry out any information processing required to prepare information for further information processing. Such information processing includes, for example, the retrieval of information from a database, reading information from a storage device, such as a memory, measuring, calculating, estimating or judging information on the basis of output signals of sensors and the like, and storing information obtained by measurement or the like in a memory by the constituent element.

Next, the function of the remote controller 2 having the above-described configuration will be described below.

Figure 4:
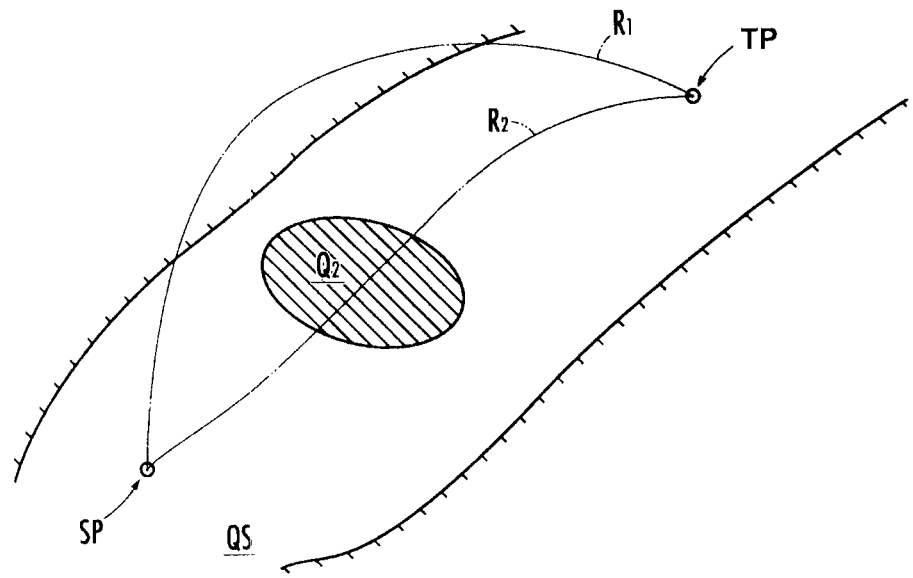
FIG. 4 is an explanatory view related to the function of the remote controller.
Figure 4:
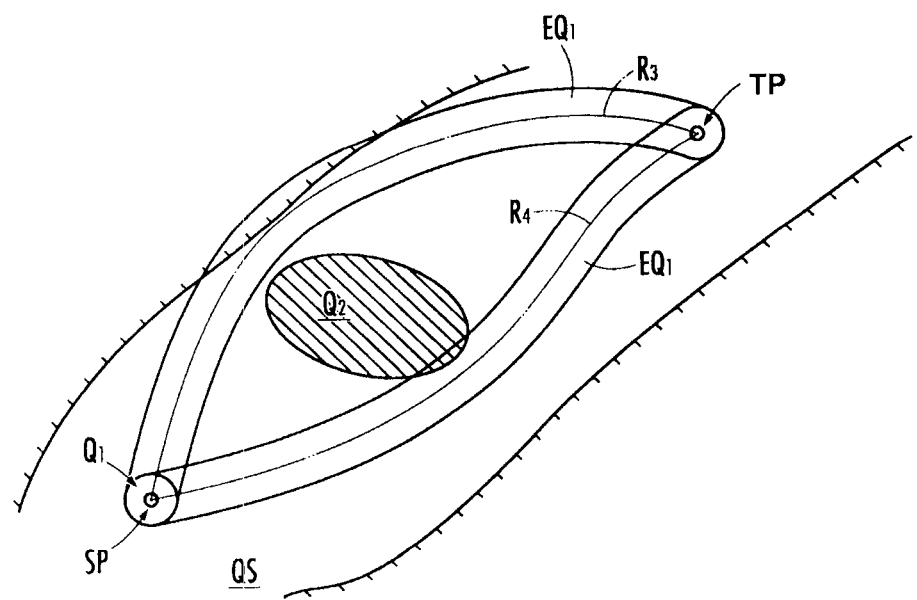

The first manipulation processing element 210 recognizes the designated route input by the user through the input device 201 (S202 in FIG. 3). The user may select the shape and the like of the designated route in view of its intention, such as making the robot 1 guide to a target position, or making the robot 1 follow the user. By doing so, as shown in FIG. 4(a), a first route (dot-and-dash line) $R_1$ or a second route (double dot-and-dash line) $R_2$ connecting a starting point SP and a terminal point TP is recognized as the designated route. The "designated route" is recognized as a quasi-continuous coordinate group in a fixed coordinate defined by latitude and longitude, or by latitude, longitude and height. Here, the designated route may be designated by designating one part of the coordinate group constituting the designated route, such as the starting point SP and the terminal point TP. The first manipulation processing element 210 recognizes the boundary of the designated region QS and the position and the external shape of the object existing in the designated region QS, by reading from a memory device, searching the database based on communication with a server (not shown), and the like (S204 in FIG. 3). By doing so, the designated region QS of a shape shown in FIG. 4(a) for example is recognized, and the object is recognized as an object region $Q_2$ in the designated region QS. Similar to the situation for the designated route, the boundary of the designated region QS is defined by the quasi-continuous coordinate group in the fixed coordinate system. Further, the first manipulation processing element 210 recognizes the robot 1 as a robot region $Q_1$ having a spatial stretch according to the size such as longitudinal and horizontal width of the robot 1, for example as shown in FIG. 4(b).

The second manipulation processing element 220 determines whether or not the designated route satisfies the stable movement requirement, on the basis of the recognition result of the first manipulation processing element 210 (S206 in FIG. 3). The "stable movement requirement" is, as described above, a requirement in which the robot 1 is capable of moving without straying away from the designated region QS as well as in a condition having low possibility of coming into contact with the object. For example, if the first route $R_1$ deviating from the designated region QS as shown in FIG. 4(a) is the designated route, it is determined that the designated route does not satisfy the stable movement requirement. Further, if the second route $R_2$ crossing with the object region $Q_2$ as shown in FIG. 4(a) is the designated route, it is determined that the designated route does not satisfy the stable movement requirement. Still further, although in the case where the designated route does not deviate from the designated region QS as shown in FIG. 4(b), if a part of an extended robot region $EQ_1$, which is formed by extending the robot region $Q_1$ along a third route (dot-and-dash line) $R_3$, deviates from the designated region QS, then it is determined that the third route $R_3$ as the designated route does not satisfy the stable movement requirement. Still further, although in the case where the designated route does not cross the object region $Q_2$ as shown in FIG. 4(b), if a part of the extended robot region $EQ_1$, which is formed by extending the robot region $Q_1$ along a fourth route (double dot-and-dash line) $R_4$, crosses the object region $Q_2$, then it is determined that the fourth route $R_4$ as the designate route does not satisfy the stable movement requirement.

If the determination result is positive, that is, if it is determined that the designated route satisfies the stable movement requirement (YES in S206 in FIG. 3), the second manipulation processing element 220 outputs positive determination result through the output device 202 (S208 in FIG. 3), and transmits the first command signal to the robot 1 (S210 in FIG. 3). The "first command signal" is a command signal for making the robot 1 move in accordance with the designated route. If the determination result is negative, that is, if it is determined that the designated route does not satisfy the stable movement requirement (NO in S206 in FIG. 3), then the second manipulation processing element 220 outputs negative determination result through the output device 202 (S212 in FIG. 3), and determines whether or not the designated route is input again by the user through the input device 201 (S214 in FIG. 3). If the designated route is input again (YES in S214 in FIG. 3), then the above-mentioned series of processing is repeated (refer to S202 and the like in FIG. 3). If the designated route is not input again (NO in S214 in FIG. 3), then the second manipulation processing element 220 outputs the content of the second command signal through the output device 202 (S216 in FIG. 3), and transmits the second command signal to the robot 1 (S218 in FIG. 3). The "second command signal" is a command signal which makes the robot 1 to decelerate or stop when the robot 1 is moving, and then makes the robot 1 search for a route having common terminal point or common starting and terminal points with the designated route and which satisfies the stable movement requirement as the target route, and when the target route is retrieved, makes the robot 1 move in accordance with the target route, and when the target route is not retrieved, makes the robot 1 stop or maintain the stopped state.

When the first command signal is received by the communication equipment 102 of the robot 1, the control device 100 sets the designated route as the target route (S102 in FIG. 3), and controls the operation of the robot 1 so as to move in accordance with the target route (S104 in FIG. 3). When the second command signal is received by the communication equipment 102 of the robot 1, the control device 100 determines whether or not the robot 1 is moving (S106 in FIG. 3). For example, it is determined whether or not the robot 1 is moving on the basis of a changing mode of a reference position of the robot 1 measured by the GPS receiver constituting the internal condition sensor group 111. If it is determined that the robot 1 is moving (YES in S106 in FIG. 3), the control device 100 makes the robot 1 to decelerate or stop (S108 in FIG. 3), and searches for a route satisfying the stable movement requirement on the basis of the internal condition and the external condition as the target route (S110 in FIG. 3). The "internal condition" includes the position, orientation and the like of the robot 1 in the fixed coordinate. The "external condition" includes the boundary of the designated region QS and the position and the external shape of the object retrieved from the database on the basis of the communication with the server, the terminal point or the starting point and the terminal point of the designated route received from the remote controller 2 by the communication equipment 102, and the like. The position of the user measured by the head camera $C_1$ may be recognized as the terminal point of the designated route. If it is determined that the robot 1 is stopping (NO in S106 in FIG. 3), the control device 100 searches for a route satisfying the stable movement requirement as the target route (S110 in FIG. 3). The control device 100 determines whether or not the target route is retrieved (S112 in FIG. 3). If the target route is retrieved (YES in S112 in FIG. 3), then the operation of the robot 1 is controlled so as to move in accordance with the target route (S104 in FIG. 3). On the other hand, if the target route is not retrieved (NO in S112 in FIG. 3), then the operation of the robot 1 is controlled so as to make the robot 1 stop or maintain its stopped state (S114 in FIG. 3).

According to the remote controller 2 exerting the above-mentioned function, when the designated route designated by the user satisfies the stable movement requirement, the "first command signal" is transmitted from the remote controller 2 to the robot 1 (refer to S206 and S210 in FIG. 3). By doing so, the user may manipulate the behavior of the robot 1 so as to make the robot 1 move in accordance with the designated route, by the use of the remote controller 2 (refer to S102 and S104 in FIG. 3).

On the other hand, when the designated route designated by the user does not satisfy the stable movement requirement, not the first command signal but the "second command signal" is transmitted from the remote controller 2 to the robot 1 (refer to S206 and S218 in FIG. 3). For example, as indicated by a white arrow in FIG. 5(*a*), when the designated route having the position of the robot 1 as the starting point and the position of the user as the terminal point via an unevenness, which corresponds to the boundary of the designated region or the object, is input to the remote controller 2 by the user, the second command signal is transmitted from the remote controller 2 to the robot 1, by determining that the designated route does not satisfy the stable movement requirement (refer to NO in S206 and S218 in FIG. 3). By doing so, the user may manipulate the behavior of the robot 1 to make the robot 1 decelerate or stop before searching for the target route when the robot 1 is moving, by the use of the remote controller 2 (refer to S106 and S108 in FIG. 3).

Further, it is possible to make the robot 1 search for a route satisfying the stable movement requirement as the target route, and if the target route is retrieved, then make the robot 1 move in accordance with the target route, and if the target route is not retrieved, then make the robot 1 stop or maintain its stopped state (refer to S110 through S114 and S104 in FIG. 3). For example, as indicated by a white arrow in FIG. 5(*b*), the target route which does not make the robot 1 step over the unevenness, but the target route reaching the position of the user measured by the head camera $C_1$ via a slope, which corresponds to the designated region, is retrieved. Here, there are cases where the user is moving. As such, the position of the user measured by the robot 1 may be different from the position of the user in the past, which is input by the remote controller 2 as the terminal point of the designated route. Therefore, even in the case where the designated route not satisfying the stable movement condition is input, the user may manipulate the behavior of the robot 1 so as to make the robot 1 move towards the terminal point of the designated route without straying away from the designated region as well as avoiding contact with the object, by the use of the remote controller 2. For example, as is shown in FIG. 5(*c*), it is possible to avoid the robot 1 from contacting the unevenness, by making the robot 1 move in accordance with the target route different from the designated route.

Further, the determination result of whether or not the designated route designated by the user is satisfying the stable movement requirement is output, and also the content of the second command signal is output by the remote controller 2 (refer to S208, S212, and S216 in FIG. 3). By doing so, it is possible to make the user recognize that the robot 1 will be moving in accordance with the designated route designated by the user, or the robot 1 will be moving in accordance with a route different from the designated route or will be stopping, and the like. Therefore, the user may manipulate the behavior of the robot 1 so as to make the robot 1 move without straying away from the designated region as well as avoiding contact with the object, while predicting the behavior mode of the robot 1, by the use of the remote controller 2.

Here, in accordance with either one or both of the first command signal and the second command signal transmitted from the remote controller 2 to the robot 1, the robot 1 may be operated to notify beforehand the upcoming behavior to the user, such as making the robot 1 output voice from the voice output device (not shown), or making the robot 1 move the arm 12 so as to wave the hand 14 while facing the front of the head 11 towards the user operating the remote controller 2. For example, it may be possible to make the robot 1 output voice such as "I am coming your way" to the user as the object of following, and output voice such as "follow me" to the user as the object of guidance, according to the first command signal. Further, it may be possible to make the robot 1 output voice such as "I will be using a different route", and operate so that the front of the head 11 face the direction towards which the target route travels, according to the second command signal.

The invention claimed is:

1. A remote controller for making a user remotely manipulate a robot moving autonomously, comprising:
a first manipulation processing element configured to recognize a designated route input by the user via an input device, and to recognize a boundary of a designated region and a position and an external shape of an object existing in the designated region; and
a second manipulation processing element configured to determine whether the designated route satisfies a stable movement requirement, wherein the stable movement requirement is satisfied when it is determined that the robot is capable of moving according to the designated route without straying away from the designated region and with a low possibility of coming into contact with the object, on the basis of the recognition result of the first manipulation processing element, and the second manipulation processing element is also configured to transmit a first command signal to the robot only after determining that the stable movement condition is satisfied by the designated route, the first command signal making the robot move according to the designated route.

2. The remote controller according to claim 1, wherein the second manipulation processing element is configured to transmit a second command signal to the robot when it is determined that the stable movement condition is not satisfied, the second command signal makes the robot search for a route which has common terminal point or common starting and terminal points with the designated route and which satisfies the stable movement requirement as a target route, and makes the robot move according to the target route when the target route is retrieved, and makes the robot stop or maintain the stopped state thereof when the target route is not retrieved.

3. The remote controller according to claim 2, wherein the second command signal makes the robot, when moving, decelerate or stop prior to searching for the target route.

4. The remote controller according to claim 1, wherein the second manipulation processing element outputs whether the designated route satisfies the stable movement requirement, or a behavior mode of the robot defined by the second command signal via an output device.

5. A remote controller for making a user remotely manipulate a robot moving autonomously, comprising:
a first manipulation processing element configured to recognize a designated route input by the user via an input device, and to recognize a boundary of a designated region and a position and an external shape of an object existing in the designated region; and a second manipulation processing element configured to determine whether the designated route satisfies a stable movement requirement, wherein the stable movement requirement is satisfied when it is determined that the robot is capable of moving according to the designated route without straying away from the designated region and with a low possibility of coming into contact with the object, on the basis of the recognition result of the first manipulation processing element, and the second manipulation processing element is also configured to transmit one of a first command signal and a second command signal to the robot, wherein the first command signal is transmitted when it is determined that the stable movement requirement is satisfied by the designated route, and the first command signal makes the robot move according to the designated route, and wherein the second command signal is transmitted when it is determined that the stable movement requirement is not satisfied, and the second command signal makes the robot search for a route which has common terminal point or common starting and terminal points with the designated route and which satisfies the stable movement requirement as a target route, and makes the robot move according to the target route when the target route is retrieved.

6. The remote controller according to claim 5, wherein the second manipulation processing element is configured make the robot stop or maintain the stopped state thereof when the target route is not retrieved.

7. The remote controller according to claim 6, wherein the second command signal makes the robot, when moving, decelerate or stop prior to searching for the route.

8. The remote controller according to claim 5, wherein the second manipulation processing element outputs whether the designated route satisfies the stable movement requirement, or a behavior mode of the robot defined by the second command signal via an output device.

9. The remote controller according to claim 5, wherein the second manipulation processing element is configured to only transmit one of the first command signal or the second command signal after determining whether the stable movement requirement is satisfied by the designated route input by the user.

10. A robot remote control system, comprising:
a robot including a plurality of legs, a control device, and communication equipment, the robot configured to move autonomously by a movement of the plurality of legs, and the control device configured to control movement of the plurality of legs based at least in part on communication with the communication equipment; and
a remote controller in remote communication with the robot communication equipment for making a user remotely manipulate the robot moving autonomously, the remote controller comprising:
a first manipulation processing element configured to recognize a designated route input by the user via an input device, and to recognize a boundary of a designated region and a position and an external shape of an object existing in the designated region;
a second manipulation processing element configured to determine whether the designated route satisfies a stable movement requirement, wherein the stable movement requirement is satisfied when it is determined that the robot is capable of moving according to the designated route without straying away from the designated region and with a low possibility of coming into contact with the object, on the basis of the recognition result of the first manipulation processing element, and the second manipulation processing element is also configured to transmit a first command signal to the robot communication equipment when it is determined that the stable movement requirement is satisfied by the designated route, the first command signal making the robot control device control the robot legs to move the robot according to the designated route; and
wherein the second manipulation processing element is configured to transmit the first command signal to the robot communication equipment only after determining that the stable movement condition is satisfied.

11. A robot remote control system, comprising:
a robot including a plurality of legs, a control device, and communication equipment, the robot configured to move autonomously by a movement of the plurality of legs, and the control device configured to control movement of the plurality of legs based at least in part on communication with the communication equipment; and
a remote controller in remote communication with the robot communication equipment for making a user remotely manipulate the robot moving autonomously, the remote controller comprising:
a first manipulation processing element configured to recognize a designated route input by the user via an input device, and to recognize a boundary of a designated region and a position and an external shape of an object existing in the designated region;
a second manipulation processing element configured to determine whether the designated route satisfies a stable movement requirement, wherein the stable movement requirement is satisfied when it is determined that the robot is capable of moving according to the designated route without straying away from the designated region and with a low possibility of coming into contact with the object, on the basis of the recognition result of the first manipulation processing element, and the second manipulation processing element is also configured to transmit a first command signal to the robot communication equipment when it is determined that the stable movement requirement is satisfied by the designated route, the first command signal making the robot control device control the robot legs to move the robot according to the designated route; and
wherein the second manipulation processing element is configured to transmit one of the first command signal and a second command signal to the robot communication equipment, wherein the second manipulation processing element transmits the second command signal to the robot communication equipment after it is determined that the stable movement condition is not satisfied, the second command signal makes the robot control device search for a route which has common terminal point or common starting and terminal points with the designated route and which satisfies the stable movement requirement as a target route, and makes the robot control device control the robot legs to move the robot according to the target route when the target route is retrieved, and makes robot control device control the robot legs to make the robot stop or maintain the stopped state thereof when the target route is not retrieved.

12. The robot remote control system according to claim 11, wherein the second command signal makes the robot control device, when the robot is moving, control the robot legs to decelerate or stop prior to searching for the target route.

13. The robot remote control system according to claim 11, wherein the second manipulation processing element is configured to only transmit one of the first command signal or the second command signal after determining whether the stable movement requirement is satisfied by the designated route input by the user.

* * * * *